Patented Nov. 6, 1951

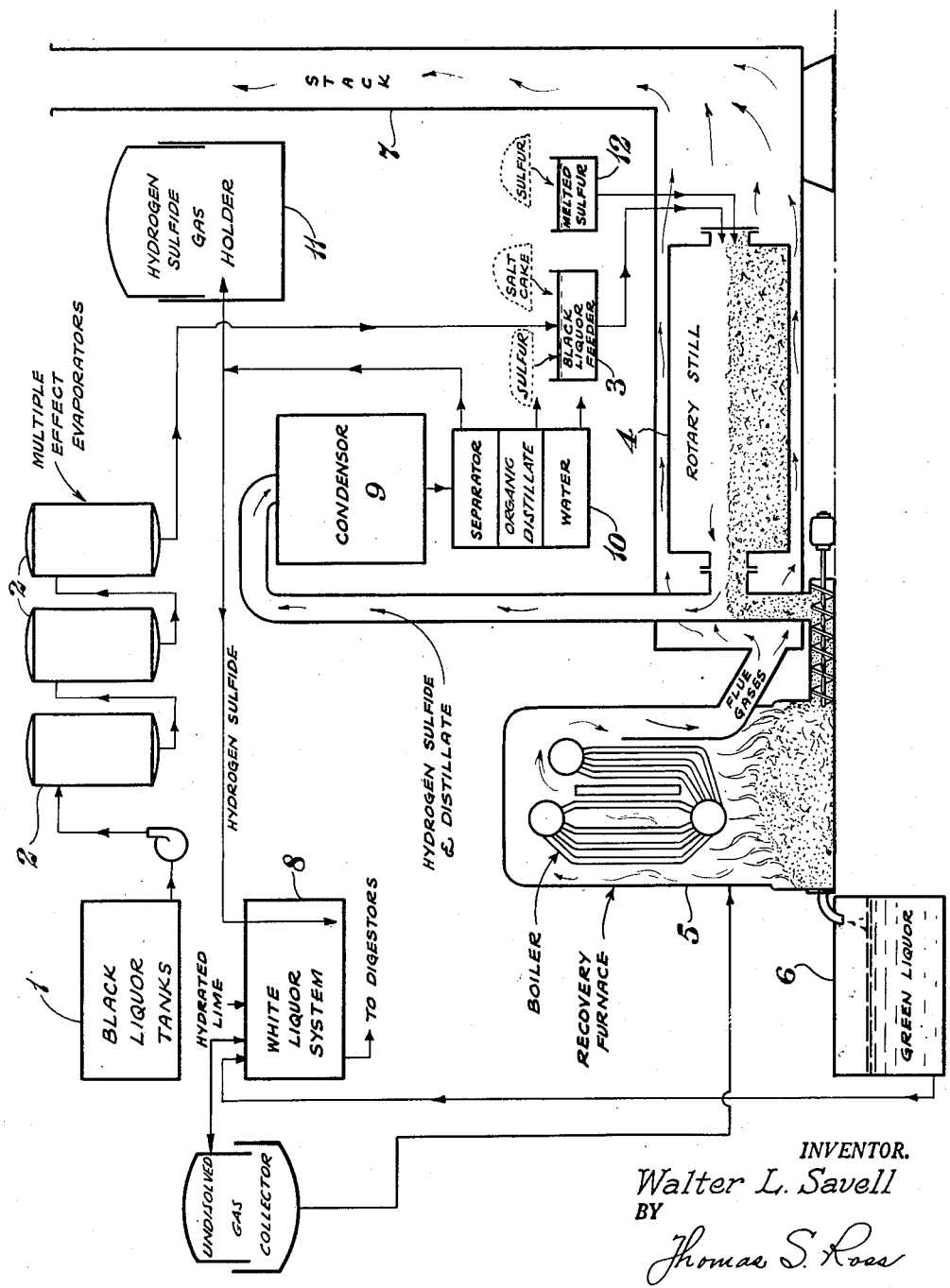

2,574,193

UNITED STATES PATENT OFFICE 2,574,193

CHEMICAL RECOVERY AND CONTROL IN THE KRAFT PULP PROCESS

Walter L. Savell, Westport, Conn., assignor to Remington Rand Inc., New York, N. Y., a corporation of Delaware Application December 6, 1947, Serial No. 790,052

6 Claims. (Cl. 252—183)

This invention relates generally to a new and economical process and method of regenerating spent cooking liquors commonly known as black liquors in the so-called kraft or sulfate process for manufacturing pulp or kraft paper.

More particularly, this invention covers novel processing methods for increasing efficiency of recovery of valuable cooking chemicals; maintaining the desired balance between the active chemical components of regenerated cooking liquor commonly known as white liquor; substantial elimination of noxious odors emanating from and characteristic of the kraft pulp process; recovery of valuable by-products from the black liquor; improved operation of the recovery-boiler furnace; and reduction of losses of sodium and sulfur compounds in the recovery boiler stack gases.

The kraft pulping process and chemical recovery process invented by Dahl in Danzig, 1879, prescribed digestion of wood chips under pressure in a solution containing sodium sulfide and caustic soda, removing spent cooking liquors from the pulp and recovering the pulp for further processing to make paper products. The spent cooking liquors are concentrated by evaporation in vacuum evaporators until the solids content of the liquor reaches 40% to 50% concentration. The liquor is then allowed to run into a rotating furnace, in which it is heated directly to substantial dryness and partly burned by the hot gases of combustion from the smelting unit in the presence of air. The smelting unit is generally a simple cylindrical furnace supplied with air, into which the solids from the rotary unit are discharged, the combustible portion burned and the melted chemicals discharged, through a tap hole, to a tank containing water or weak liquors, to form the green liquor. The green liquor is further processed by causticising with hydrated lime to convert the sodium carbonate to caustic soda to form the white liquor, which again enters the pulping process as cooking liquor.

There have been many inprovements in equipment and control methods with consequent increase in efficiencies in heat and chemical recovery, but the entire cycle of pulping and chemical recovery processes, as practiced today, remains essentially the same as described and operated by Dahl.

Although the kraft pulping process, which is the digestion of wood chips in the alkaline liquors previously mentioned and the chemical recovery operations associated therewith, has been refined and is under much better control today than it was at the time the process was invented, the pulping and recovery methods are identical in all essential respects with those described by the original inventor. The washing of the pulp and recovery of spent liquor have been improved by modern machinery and controls. The same may be said of the evaporation and concentration of the spent (black liquors) liquors. A revolutionary improvement was made in the overall efficiency of the kraft pulp mill operation, with the invention of the recovery furnace-steam generating boiler combination, which makes use of the heat value in the black liquor to generate steam for process operation. It will be noted, however, that none of the improvements mentioned has actually changed the process in any essential respect.

Sodium sulfate, a relatively expensive chemical, as compared with the calcium bisulfite used in the sulfite pulp industry, is the source of the sodium sulfide and sodium hydroxide (caustic soda) which are the active chemicals in the kraft cooking liquor. The sodium sulfate is reduced to sodium sulfide by smelting in a reducing atmosphere supplied by the combustion of the organic residues of the black liquor. In the recovery-boiler furnace, where the sodium sulfate is in contact with carbonaceous residues from the black liquor the reduction occurs substantially as follows:

1.  $Na_2SO_4 + 4C \rightarrow Na_2S + 4CO$

As the kraft pulping process requires the presence of caustic soda (sodium hydroxide) in the cooking liquor, it follows that additions of this compound in one form or another would be required to maintain the desired balance between caustic soda and sodium sulfide in the cooking liquors if the sodium sulfide formed by the reduction of sodium sulfate in the recovery furnace was recovered as such after passing through the pulping and chemical recovery cycle. Heretofore, in the pratice of the kraft pulping process, the reverse condition is experienced. Due to the properties of the chemicals used and the conditions involved, a large proportion of the sodium sulfide is converted to caustic soda in passing through the cycle of pulping and recovery operations. The sulfur lost by this conversion may amount to as much as 50% daily of the amount present in the liquors which pass through the complete cycle. The loss of sulfur is always greater than the loss of sodium base compounds with the result that the ratio of caustic soda to sodium sulfide tends to increase constantly in the regenerated cooking liquors (white liquor). This condition limits the efficient recovery of spent cooking liquors as the sulfur losses are replaced in the form of salt cake which necessarily brings additional amounts of sodium base as well as sulfur into the process. It is common practice to discard black liquors washed from pulp, at concentrations sufficiently high to permit economical recovery, in order to use more salt cake to bring sulfidity up to the desired ratio. The loss of sulfide-sulfur is of such significance that many attempts have been made to replace these losses by introducing elemental sulfur into various parts of the chemical system for the purpose of increasing the sodium sulfide content of the regenerated cooking liquor.

Several important factors in the kraft black liquor recovery process have been overlooked or disregarded by previous inventors. These factors are noted hereinafter and applied to accomplish the aforestated purposes of this invention.

During the passage of kraft black liquor through multiple (or other) effect evaporators sodium sulfide hydrolyzes and relatively small amounts of hydrogen sulfide are evolved and pass off with the water vapor thus:

I    $Na_2S + 2H_2O \rightarrow 2NaOH + H_2S$

However, the sulfur loss represented in I is relatively small and may be disregarded when considered alone. However, in the secondary stage of evaporation where the black liquor concentration is increased from 40%–50% to 60%–70% (or more) solids, it is the universal practice to conduct the evaporation by exposure of the black liquor directly to hot flue gases from the recovery-boiler furnace. Heavy losses of sulfur are experienced from this practice. As the gases of combustion having high concentrations of carbon dioxide and sulfur dioxide, make contact with the black liquor the following reactions occur—

II    $CO_2 + H_2O + Na_2S \rightarrow Na_2CO_3 + H_2S$

III    $SO_2 + H_2O + Na_2S \rightarrow Na_2SO_3 + H_2S$

The hydrogen sulfide evolved passes off with the flue gases. There is evidence that some of the hydrogen sulfide, so formed, reacts with the sulfur dioxide present in the flue gases thus—

IV    $2H_2S + SO_2 \rightarrow 2H_2O + S$

Part of the sulfur so formed passes off with the flue gases and part remains in the exposed black liquor. Most of the sulfur and its compounds in the flue gases are oxidized and some are found in the flue dust as sodium sulfate. There is some formation of elemental sulfur in the black liquor by Reaction IV.

The greatest losses of sulfur occur upon delivery of black liquor into the recovery-boiler furnace where Reactions I, II, and III proceed at a maximum rate and reaction of elemental sulfur from Reaction IV with the organic content, occurs as the block liquor chars in this manner—

V    $2C_xH_y + \frac{y}{2}S \rightarrow 2xC + yH_2S$ where $C_xH_y$ represents any organic residue of wood extraction. Sulfur reacts with all common organic substances including tar, fuel, oil, wood, sawdust, black liquor solids, etc., to form hydrogen sulfide when these materials are mixed with sulfur and the mixture heated.

The conditions described account for the failure of previously mentioned processes which attempt to increase sulfur content of the smelt, by adding elemental sulfur to the black liquor at any point. The introduction of liquid black liquor into the smelting furnace results in sulfur losses by Reaction I, II, III, IV, and V, above referred to.

My invention provides for the recovery of all the sulfur losses shown in the Reactions I, II, III, IV, and V in the processing concentrated black liquor and utilizes the conditions and reactions normal to the kraft chemical recovery process to accomplish the purposes aforestated.

As has been shown, the exposure of black liquor, at any stage in its concentration, to flue gases and the atmosphere of the recovery-boiler furnace, promotes and accounts for the major loss of sulfur from black liquor passed through the recovery process. It will be noted that the formation of large quantities of hydrogen sulfide is normal to the process and if sulfur losses are to be avoided provision must be made to conduct the recovery operations so as to permit economical utilization of the volatile sulfur compounds generated during concentration and charring of black liquor. It therefor follows that all stages of the concentration to the point at which the black liquor is reduced to a char should be conducted out of contact with air or flue gas in order to conserve the sulfur content and to establish the optimum conditions necessary to make the volatilized sulfur compounds recoverable in an immediately useful form. It is to be noted, also, that it is desirable to introduce charred residue of the black liquor into the recovery furnace in order to substantially eliminate the losses of valuable chemicals in the form of spray and dust which invariably accompany the almost explosive evaporation which occurs when liquid black liquor is introduced and sprayed on the hot walls of the furnace. Some losses of black liquor itself results from carry over of the finer spray particles which cause fouling of boiler tubes, dust hoppers and flues. More uniform operation of the smelting-boiler furnace results from the use of black liquor char as fuel. The heavy load of moisture, present in black liquor, is eliminated, "blackouts" and "jelly-rolls" are prevented, furnace refractories are better preserved as they are not subjected to such extremes of temperature and improved fuel efficiency and steam generation are accomplished.

According to my present invention, black liquor is concentrated in the conventional manner from 40% to 60% or higher if possible, in multiple effect, vacuum evaporators. It is then passed to a secondary processing equipment to which indirect heat is applied to distill the liquor destructively until the liquor is substantially carbonized. During this operation, hydrogen sulfide, organic distillate and water are evolved. These volatile products are passed through a condensing system which collects the water and organic distillate. The hydrogen sulfide does not condense, but is passed to a gas holder for use as required, or is run directly to the white liquor system where it is absorbed to form sodium sulfide to restore the chemical balance between sodium hydroxide and sodium sulfide.

As previously indicated there will be some overall loss of sulfur in the cycle of operations which must be made up by additions in one form or another. This loss is readily compensated, in my invention, by introducing elemental sulfur into the black liquor as it goes to the indirect heated secondary processing equipment. During the charring operation the elemental sulfur so introduced reacts with the organic matter of the black liquor to form hydrogen sulfide as shown in reaction V and with the sodium alkali present to form sodium-sulfur compounds, which are later reduced to sodium sulfide in the recovery furnace. By controlled addition of sulfur to the black liquor the flow of hydrogen sulfide to the white liquor or gas holder may be adjusted, according to the necessities of the process, without delay and without the formation of unnecessary and unwanted compounds such as those which result when sulfur is introduced into green liquors, white liquors or directly into the digestors.

Referring now to the accompanying drawing which is a diagrammatic showing of one embodiment of my invention, reference numeral 1 indicates one or more black liquor storage tanks, and 2 indicates multiple effect evaporators. The diluted black liquor is stored in these tanks and concentrated in the evaporators in the usual and well-known manner. The concentrated black liquor from the multiple effect evaporators may pass directly to the final evaporator (dryer) and indirectly heated retort or distilling apparatus 4, wherein the organic material is dried and substantially decomposed, as shown in the drawing, or the concentrated black liquor may pass through intermediate equipment 3 in which necessary make-up quantities of salt cake may be mixed with the black liquor prior to final drying, distillation, and charring. Although it is preferred to indirectly heat the final drying and distilling apparatus with flue gases from the recovery furnace, other sources of heat are contemplated within the scope and spirit of this invention. For example, it is anticipated that in certain installations separate drying apparatus would be provided and distilling apparatus of other types may be utilized, such as flash drying with super-heated steam, surface film evaporators, or other well-known methods of drying.

Quantities of sulfur required to form the hydrogen sulfide needed to maintain the desired balance between the caustic soda and sodium sulfide in the white liquor, may be added in intermediate apparatus 3 or it may be run as a molten liquid separately from the tank 12, into the final drying or distilling unit or units 4 where destructive distillation occurs.

In the accompanying drawing, final drying and evaporation are indicated as conducted in a rotary still. Gases and vapors from the rotary still or retort 4 pass to condensor 9 from which the condensed liquids pass to separator 10. The non-condensible gases, largely hydrogen sulfide, pass either directly to the white liquor process system 8 or to a gas holder 11, from which the stored gases may be drawn to the white liquor process system 8 as desired. Any suitable system of gas absorption may be used in the white liquor system 8, such as direct introduction of the gases beneath the surface of white liquor; the introduction of a spray of white liquor into a chamber containing the gas; a tower and spray or plate system or any other desirable gas absorption system. Alkaline solutions other than white liquor may be used to dissolve the hydrogen sulfide.

Inasmuch as varying quantities of non-condensible gases will be evolved from the distilling apparatus 4 in addition to hydrogen sulfide, these gases will pass through the absorption apparatus 8 without dissolving and may be collected for use as fuel or other purposes. The dried and charred residue from distilling apparatus 4 is fed to the fuel bed of recovery furnace 5 wherein the carbonaceous content is burned and the inorganic content, chiefly sodium carbonate and sodium sulfide, is melted and allowed to drain from the furnace 5 into green liquor tank 6. Gases from recovery furnace 5, as shown in the drawing, pass over drying and distilling apparatus 4 and thence to stack 7. The organic distillate and water collected in separator 10, is drawn to suitable storage for further processing or waste as desired. The organic distillate may be utilized as fuel or processed to recover valuable chemical components. It will be noted that the process covered in my invention provides for all operations involving the concentration, drying and dry distillation of the black liquor to be conducted in closed equipment to prevent contact with air or flue gases.

By these means control and retention of volatile chemical values, in concentrated form, is established and maintained, complete control of white liquor composition is provided for the first time, the pollution of the atmosphere with compounds of obnoxious odors is prevented by collection of volatile sulfur compounds and the volume of gases to be handled reduced to the minimum.

While I have shown and described a particular embodiment of my invention it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

What is claimed is:

1. The method of regenerating soda pulp cooking liquor which comprises concentrating used cooking liquor by evaporation, adding salt cake to the concentrated liquor, heating the salt cake containing concentrated liquor and destructively distilling and carbonizing said liquor with flue gases while preventing exposure of said liquor to said gases to obtain a distillate and a substantially carbonized residue from said concentrated liquor, separating hydrogen sulfide from the distillate, burning said residue to form a melt of inorganic salts and dissolving the inorganic salts in aqueous solution, causticizing the inorganic salt solution and absorbing in said causticized solution hydrogen sulfide obtained by destructively distilling said cooking liquor.

2. The method of regenerating soda pulp cooking liquor which comprises concentrating used cooking liquor by evaporation, adding salt cake to the concentrated liquor, heating the salt cake containing concentrated liquor and destructively distilling and carbonizing said liquor with flue gases while preventing exposure of said liquor to said gases to obtain a distillate and a substantially carbonized residue from said concentrated liquor, collecting, condensing and separating the distillate components to obtain hydrogen sulfide, burning said residue to form a melt of inorganic salts, dissolving the inorganic salts melt in aqueous solution, causticizing the inorganic salts solution and absorbing in said causticized solution hydrogen sulfide obtained by destructively distilling said cooking liquor.

3. The method of regenerating soda pulp cooking liquor which comprises concentrating used cooking liquor by evaporation, adding salt cake to the concentrated liquor, heating the salt cake containing concentrated liquor and destructively distilling and carbonizing said liquor with flue gases while preventing exposure of said liquor to said gases to obtain a distillate and a substantially carbonized residue from said concentrated liquor, collecting, condensing and separating the distillate components to obtain hydrogen sulfide, burning said residue as fuel to obtain a melt of inorganic salts and flue gases, dissolving the inorganic salts melt in aqueous solution, causticizing the inorganic salts solution and absorbing in said causticized solution hydrogen sulfide obtained by destructively distilling said cooking liquor.

4. The method of regenerating soda pulp cooking liquor which comprises concentrating used cooking liquor by evaporation, adding sulfur to the concentrated liquor, heating the sulfur containing concentrated liquor and destructively distilling and carbonizing said liquor with flue gases while preventing exposure of said liquor to said gases to obtain a distillate and a substantially carbonized residue from said concentrated liquor, separating hydrogen sulfide from the distillate, burning said residue to form a melt of inorganic salts and dissolving the inorganic salts in aqueous solution, causticizing the inorganic salts solution and absorbing in said causticized solution hydrogen sulfide obtained by destructively distilling said cooking liquor.

5. The method of regenerating soda pulp cooking liquor which comprises concentrating used cooking liquor by evaporation, adding sulfur to the concentrated liquor, heating the sulfur containing concentrated liquor and destructively distilling and carbonizing said liquor with flue gases while preventing exposure of said liquor to said gases to obtain a distillate and a substantially carbonized residue from said concentrated liquor, collecting, condensing and separating the distillate components to obtain hydrogen sulfide, burning said residue to form a melt of inorganic salts, dissolving the inorganic salts melt in aqueous solution, causticizing the inorganic salts solution and absorbing in said causticized solution hydrogen sulfide obtained by destructively distilling said cooking liquor.

6. The method of regenerating soda pulp cooking liquor which comprises concentrating used cooking liquor by evaporation, adding sulfur to the concentrated liquor, heating the sulfur containing concentrated liquor and destructively distilling and carbonizing said liquor with flue gases while preventing exposure of said liquor to said gases to obtain a distillate and a substantially carbonized residue from said concentrated liquor, collecting, condensing and separating the distillate components to obtain hydrogen sulfide, burning said residue as fuel to obtain a melt of inorganic salts and flue gases, dissolving the inorganic salts melt in aqueous solution, causticizing the inorganic salts solution and absorbing in said causticized solution hydrogen sulfide obtained by destructively distilling said cooking liquors.

WALTER L. SAVELL.

REFERENCES CITED

The following references are of record in the file of this patent:

UNITED STATES PATENTS

| Number | Name | Date |
| --- | --- | --- |
| 1,499,363 | Goodell | July 1, 1924 |
| 1,900,506 | Kumler | Mar. 7, 1933 |
| 1,906,886 | Richter | May 2, 1933 |
| 2,358,187 | Savell | Sept. 12, 1944 |
| 2,391,566 | Goodell | Dec. 25, 1945 |
| 2,416,413 | Tomersett | Feb. 25, 1947 |

FOREIGN PATENTS

| Number | Country | Date |
| --- | --- | --- |
| 6,652 | Great Britain | 1912 |
| 528,786 | Great Britain | Nov. 6, 1940 |